(12) United States Patent
Mowla et al.

(10) Patent No.: US 9,179,606 B2
(45) Date of Patent: Nov. 10, 2015

(54) FLORAL ASSEMBLY

(71) Applicant: Jolly Blossoms LLC, Grapevine, TX (US)

(72) Inventors: Maryam Mowla, Grapevine, TX (US); Siavash Hozhabri, Grapevine, TX (US)

(73) Assignee: Jolly Blossoms LLC, Grapevine, TX (US)

( * ) Notice: Subject to any disclaimer, the term of this patent is extended or adjusted under 35 U.S.C. 154(b) by 128 days.

(21) Appl. No.: 14/091,934

(22) Filed: Nov. 27, 2013

(65) Prior Publication Data

US 2015/0143747 A1 May 28, 2015

(51) Int. Cl.
*A01G 9/02* (2006.01)
*A01G 5/04* (2006.01)
*A01G 5/06* (2006.01)

(52) U.S. Cl.
CPC ... *A01G 5/04* (2013.01); *A01G 5/06* (2013.01)

(58) Field of Classification Search
CPC .................................. A01G 5/04; A01G 5/06
See application file for complete search history.

(56) References Cited

U.S. PATENT DOCUMENTS

| | | | | |
|---|---|---|---|---|
| 3,290,820 | A | * | 12/1966 | Aebersold ..................... 47/41.12 |
| 3,962,825 | A | * | 6/1976 | O'Connell .................... 47/41.12 |
| 5,414,957 | A | | 5/1995 | Kenney |
| 5,454,189 | A | | 10/1995 | Graham et al. |
| 5,987,814 | A | * | 11/1999 | Ray .............................. 47/41.12 |
| 6,055,769 | A | * | 5/2000 | Ray .............................. 47/41.12 |
| 6,688,040 | B1 | * | 2/2004 | Yang .............................. 47/41.1 |
| 6,862,841 | B2 | | 3/2005 | Ghiotti |
| D543,129 | S | | 5/2007 | Buzzelli |
| 7,305,794 | B1 | * | 12/2007 | Cantrell ....................... 47/41.12 |
| 7,310,910 | B2 | | 12/2007 | Miller et al. |
| 8,151,516 | B1 | * | 4/2012 | Harshman .................... 47/41.01 |

\* cited by examiner

*Primary Examiner* — Kristen C Hayes
(74) *Attorney, Agent, or Firm* — Keith E. Taber

(57) ABSTRACT

A floral display comprising a frame for securing water retaining florist foam in a decorative shape that may be hung for display. The floral display frame provides for simple securing of the foam and allows access to the foam for complete floral coverage.

12 Claims, 5 Drawing Sheets

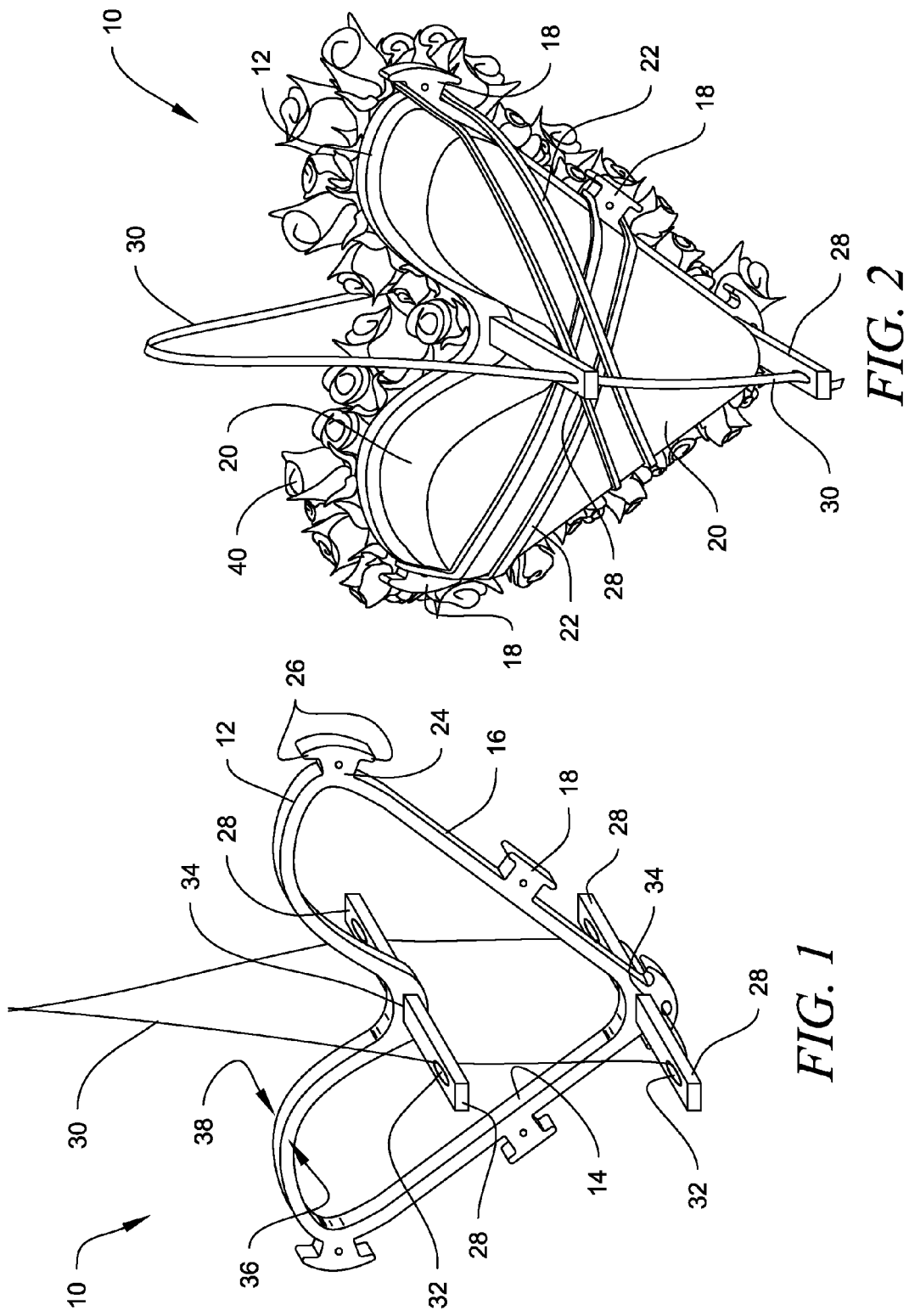

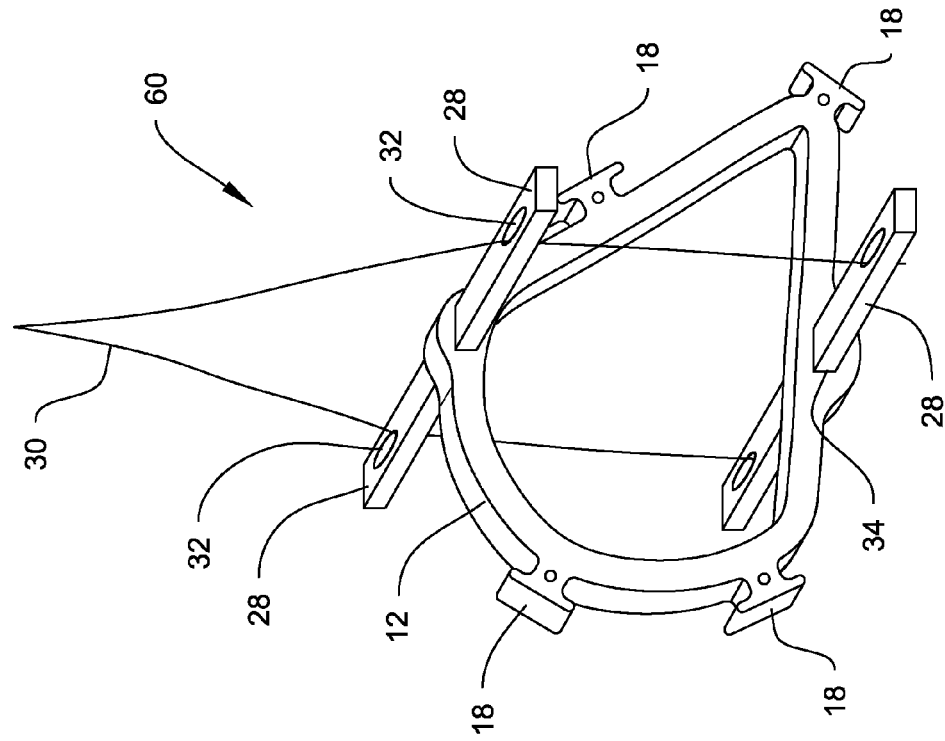
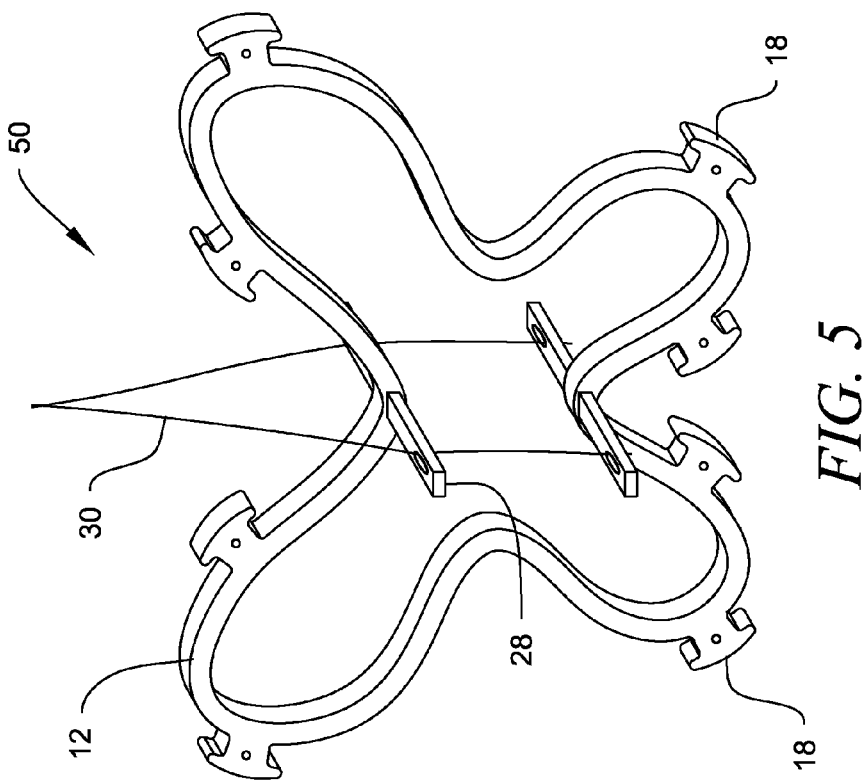
FIG. 5
FIG. 6

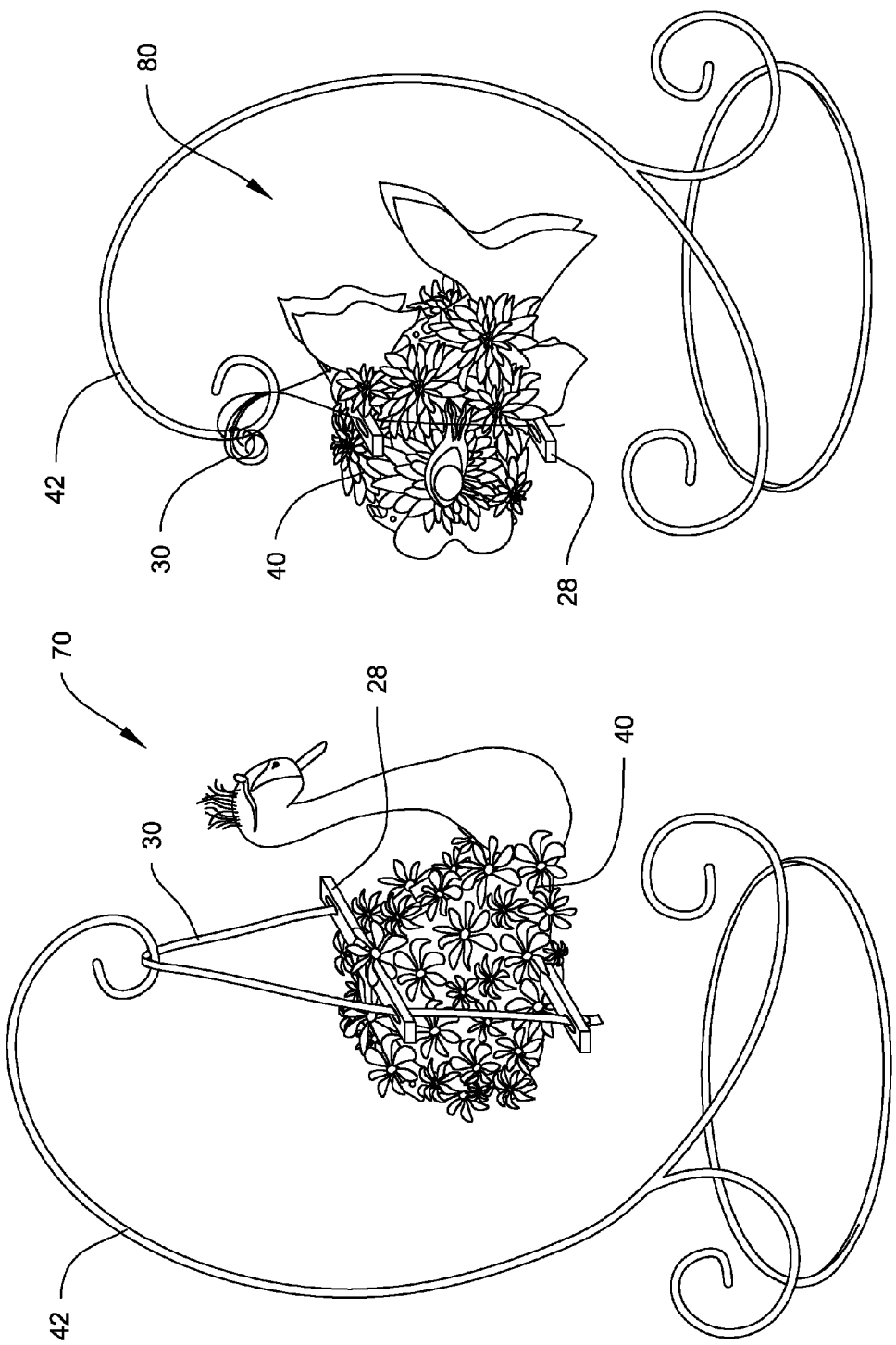

FLORAL ASSEMBLY

BACKGROUND

1. Field of the Invention

The present invention relates generally apparatus and methods for displaying flowers and other decorative plants.

2. Description of Related Art

Bouquets and other floral displays have moved well past the "gathered bunch of flowers" tied with a pretty ribbon. Technological advancement has allowed floral displays to expand into great structures and small. One such advancement is water retaining floral foam that may be cut into various shapes to fit into vessels and support flowers from commercial flower displays to personal sized displays.

Within the floral display industry, and in particular within the personal sized display market, current means for supporting as floral display are either unduly complex or require extensive training to create inspiring shapes and designs. These limitations exist because there has been a lack of simple design forms that allow for a base of creative expression.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems presented in the field of floral display are addressed by the systems and methods of the present invention. In accordance with one embodiment of the present invention, a floral display is described. The floral display comprises a frame for securing water retaining florist foam in a decorative shape that may be hung for display. The floral display frame provides for simple securing of the foam and allows access to the foam for complete floral coverage.

Other objects, features, and advantages of the present invention will become apparent with reference to the drawings and detailed description that follow.

BRIEF DESCRIPTION OF THE DRAWINGS

FIG. 1 is a view of as typical floral display prior to adding floral foam and floral material;

FIG. 2 is a back view of the floral display from FIG. 1 with floral foam secured and floral material added to the face;

FIG. 5 is a view of a floral display prior to adding floral foam and floral material;

FIG. 6 is a view of a floral display prior to adding floral foam and floral material;

FIG. 7 is an overall view of the floral display from FIG. 6 completed to resemble a swan;

FIG. 8 is an overall view of a the floral display from FIG. 6 completed to resemble as fish;

DETAILED DESCRIPTION OF THE PREFERRED EMBODIMENT

Figure 4:
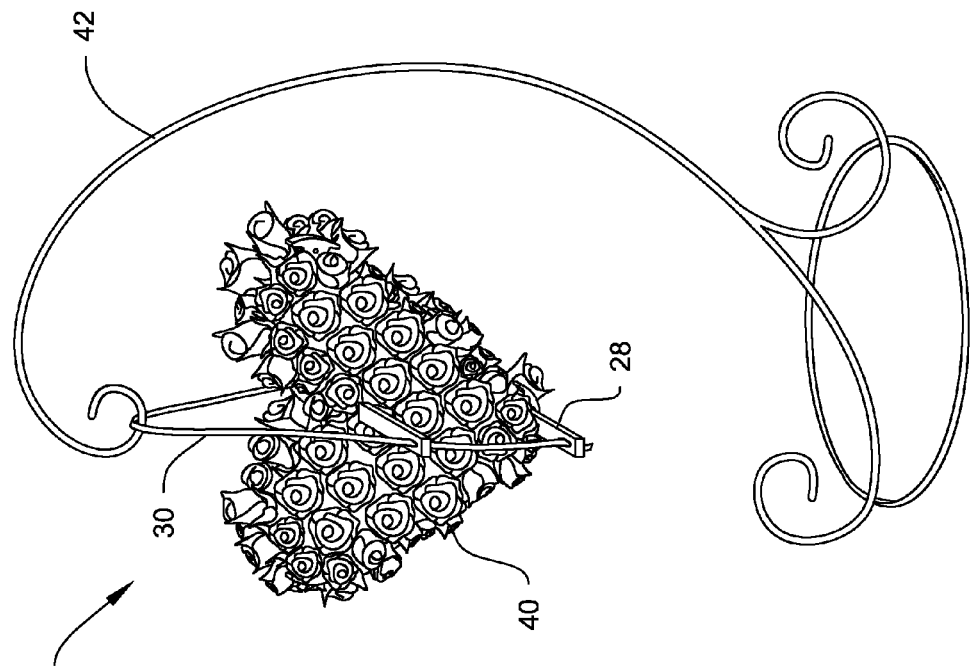
FIG. 4 is an overall view of a completed floral display from FIG. 1, 2, or 3 on a stand.

All references cited herein are incorporated by reference to the maximum extent allowable by law. To the extent a reference may not be fully incorporated herein, it is incorporated by reference for background purposes and indicative of the knowledge of one of ordinary skill in the art.

In the following detailed description of the preferred embodiments, reference is made to the accompanying drawings, which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

FIG. 1 is a view of a typical floral display 10 prior to adding floral foam 20 and floral material 40. This view best shows the frame 12 and its features. The frame 12 has an interior edge 14 and exterior edge 16. Interior edge 14 defines the decorative shape that the display 10 will take once floral material 40 is added. Exterior edge 16 is generally parallel to interior edge 14. Anchors 18 extend from exterior edge 16.

Floral foam 20 (not shown) is cut to the shape of interior edge 14. Floral foam 20 is typically of a water retaining nature and allows for floral material 40 to be placed and retain appropriate hydration. Anchors 18 allow for the placement of retaining bands 22 to secure floral foam 20 within frame 12. Anchors 18 have a base 24 that extends from exterior edge 16 and protrusions 26 that extend in opposing directions from base 24.

Frame 12 has a face 36 and a back 38, although until the floral material 40 is added there is no difference between the face 36 and the back 38. Even with the addition of floral material 40 the designer may choose to make the face 36 and back 38 identical. Supports 28 extend from the face 36 and back 38 beyond expected depth of the floral foam 20. A support string 30 is attached to the supports to allow the display to be hung for display. The support string 30 may be a string, wire, filament, yarn, ribbon, or any similar element depending on the decorative aims of the display. Each support 28 may have string holes 32 to make attachment of the support string easier. The number and location of the supports 28 will depend on the decorative shape of the frame 12.

The frame 12 may be molded of a single piece or may be cut from sheet material, as shown. When frame 12 is cut from sheet material slots 34 may be added at the locations where supports 28 are needed. Slots 34 would be between the interior edge 14 and the exterior edge 16 and extend from the face 36 to the back 38. Supports 28 may then be inserted through slots 34 to protrude evenly from the face 36 and the back 38.

The frame 12 is preferably formed of a clear material so that it is less likely to be visible if the floral material 40 fails to completely cover frame 12. Green tones may also be used for the material of frame 12, as well as any other color that is not likely to stand out from the floral material.

FIG. 2 is a back view of the floral display 10 from FIG. 1 with floral foam 20 secured and floral material 40 added to the face 36. As is clear from this view of the back 38 of frame 12, floral foam 20 is cut to fit within interior edge 14 and then shaped as needed to conform to the desired design. Retaining bands 22 are attached to anchors 18 to secure the floral foam 20 within the frame 12. Support string 30, in this case a ribbon, is securely attached to one support 28 and passes through a string hole 32 in a second support 28. Floral material 40 can be seen extending from the opposite side of the frame 12. Generally, floral material 40 will be added to both sides of the display and the floral material 40 will cover frame 12, floral foam 20, and retaining bands 22.

Figure 3:
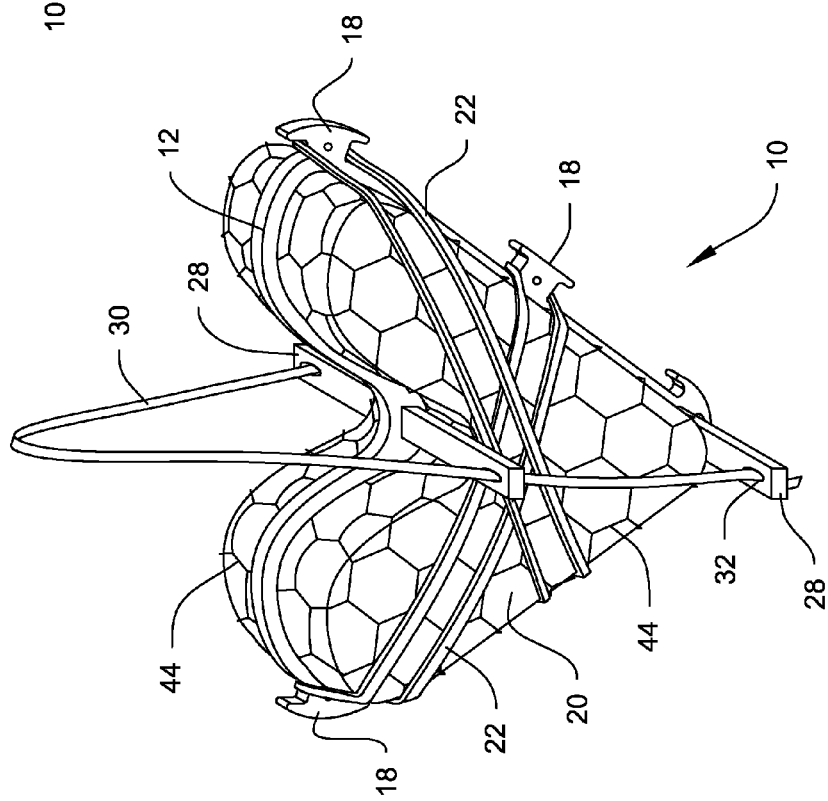
FIG. 3 is a front view of a floral display with netting added.

FIG. 3 is a front view of a floral display 10 similar to that shown in FIG. 2 but with protective netting 44 added. Netting 44 may be added of floral foam 20 to provide additional structural support as floral material 40 is added to display 10. Netting 44 will not always be required and is an optional element to be used as needed.

FIG. 4 is a front view of the floral display 10 of FIG. 1, 2, or 3. Floral display 10 is hanging from a stand 42 by support string 30. Floral foam 20, retaining bands 22, netting 44 (if used), and frame 12, are completely covered by floral material 40 placed in the floral foam. The floral material 40 and a portion of support string 30 are all that should be visible.

FIG. 5 is a view of a floral display 50 prior to adding floral foam 20 and floral material 40. Frame 12 is shaped to allow the floral designer to mimic the shape of a butterfly or moth.

FIG. 6 is a view of a floral display 60 prior to adding floral foam 20 and floral material 40. Frame 12 is shaped to allow the floral designer to mimic many different shapes, from a swan to a fish, as shown in FIG. 7 and FIG. 8.

FIG. 7 is an overall view of the floral display 60 from FIG. 6 completed to resemble a swan and FIG. 8 is an overall view of a the floral display 60 from FIG. 6 completed to resemble a fish. Additional decorative elements may be added along with the floral material 40 to create the desired shapes.

Figure 9:
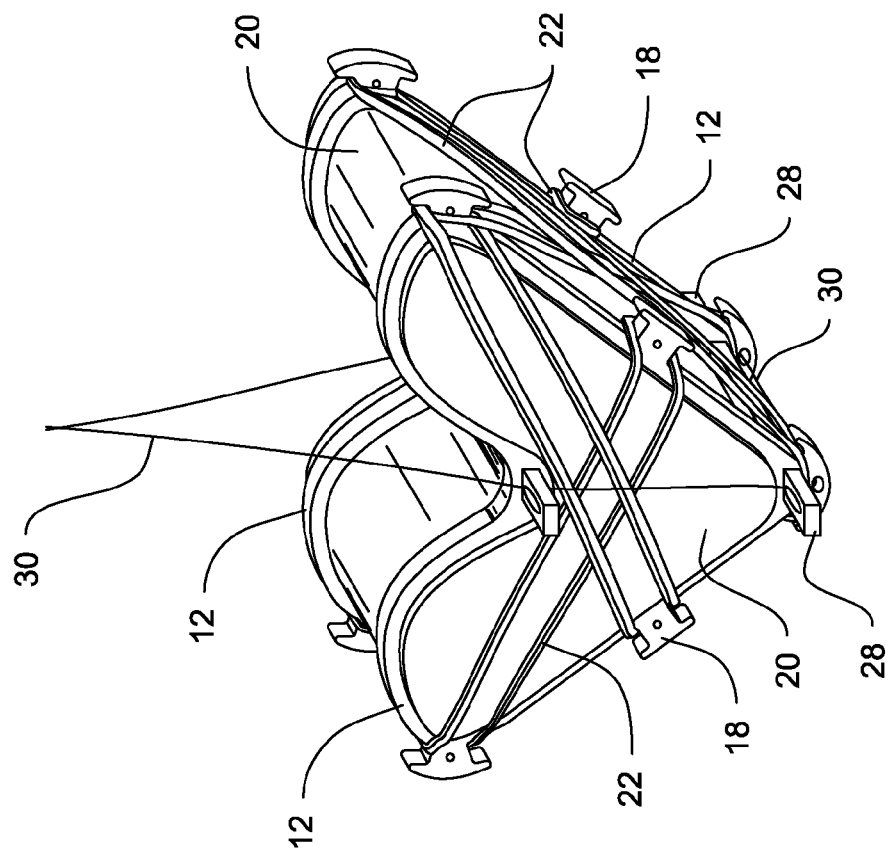
FIG. 9 is a view of a floral display using two frames.

FIG. 9 is a view of a floral display using two frames 12 positioned near the edges of the foam 20. This positioning reduces the likelihood that the edges of the foam 20 will be damage or rounded during handling and addition of floral material 40.

Figure 10:
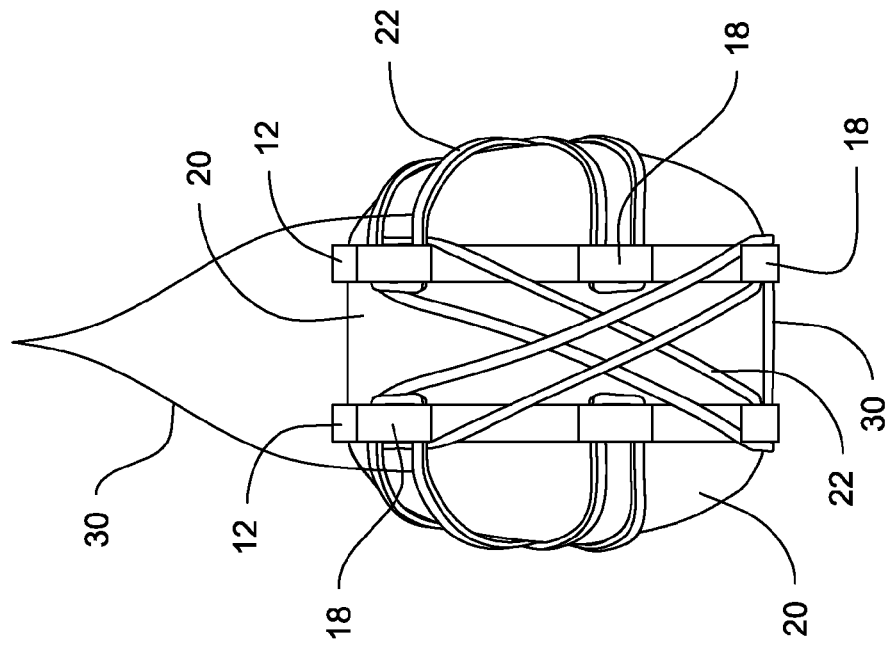
FIG. 10 is a side view of a floral display using two frames and having added floral foam.

FIG. 10 is a side view of a floral display 10 using two frames 12 and having added floral foam 20. The frames 12 are positioned near the edges of floral foam 20 and then additional floral foam 20 is added outside the frames 12 to give the display 10 a more rounded shape or more thickness.

It should be apparent from the foregoing that an invention having significant advantages has been provided. While the invention is shown in only a few of its forms, it is not just limited but is susceptible to various changes and modifications without departing from the spirit thereof. For example, frame 12 may define multiple pieces of floral foam 20 and supports 28 may be moved wherever needed to support the frame 12.

The invention claimed is:

1. A floral display comprising:
a frame having an interior edge and an exterior edge, the interior edge conforming to a predetermined decorative shape, the exterior edge having a plurality of anchors;
water retaining floral foam cut to fit within the interior edge of the frame; and
flexible retaining bands secured to the anchors and extending around the water retaining foam, securing the foam within the frame wherein:
the flexible retaining bands are elastic loops.

2. The display of claim 1 wherein:
each anchor consists a base extending from the exterior edge and protrusions extending in opposing directions from the base.

3. A floral display comprising:
a frame having an interior edge and an exterior edge, the interior edge conforming to a predetermined decorative shape, the exterior edge having a plurality of anchors;
water retaining floral foam cut to fit within the interior edge of the frame; and
flexible retaining bands secured to the anchors and extending around the water retaining foam, securing the foam within the frame wherein:
the flexible retaining bands are comprised of at least one length of string.

4. A floral display comprising:
a frame having an interior edge and an exterior edge, the interior edge conforming to a predetermined decorative shape, the exterior edge having a plurality of anchors;
water retaining floral foam cut to fit within the interior edge of the frame; and
flexible retaining bands secured to the anchors and extending around the water retaining foam, securing the foam within the frame wherein:
the frame has supports extending from the frame and a support string attached to the supports to allow for the frame to be hung.

5. The display of claim 4 wherein:
the frame has a face and a back, and an even length of each support extends perpendicular to the face and the back, each support has holes to accept the support string.

6. The display of claim 4 wherein:
the frame has a face and a back, and slots that extend from the face to the back between the interior edge and the exterior edge, the supports are inserted through the slots such that an even length of each support extends perpendicular to the face and the back, each support has holes to accept the support string.

7. A floral display kit comprising:
a frame having an interior edge and an exterior edge, the interior edge conforming to a predetermined decorative shape, the exterior edge having a plurality of anchors;
water retaining floral foam cut to fit within the interior edge of the decorative frame;
flexible retaining bands secured to the anchors and extending around the water retaining foam, securing the foam within the decoratively shaped frame; and
instructions on how to assemble the foam within the frame and retain the foam in position with the flexible retaining bands wherein:
the flexible retaining bands are elastic loops.

8. The kit of claim 7 wherein:
each anchor consists a base extending from the exterior edge and protrusions extending in opposing directions from the base.

9. A floral display kit comprising:
a frame having in interior edge and an exterior edge, the interior edge conforming to a predetermined decorative shape, the exterior edge having a plurality of anchors;
water retaining floral foam cut to fit within the interior edge of the decorative frame;
flexible retaining bands secured to the anchors and extending around the water retaining foam, securing the foam within the decoratively shaped frame; and
instructions on how to assemble the foam within the frame and retain the foam in position with the flexible retaining bands wherein:
the flexible retaining bands are comprised of at least one length of string.

10. A floral display kit comprising:
a frame having an interior edge and an exterior edge, the interior edge conforming to a predetermined decorative shape, the exterior edge having a plurality of anchors;
water retaining floral foam cut to fit within the interior edge of the decorative frame;

flexible retaining bands secured to the anchors and extending around the water retaining foam, securing the foam within the decoratively shaped frame; and instructions on how to assemble the foam within the frame and retain the foam in position with the flexible retaining bands wherein:

the frame has supports extending from the frame and a support string attached to the supports to allow for the frame to be hung.

11. The kit of claim 10 wherein:

the frame has a face and a back, and an even length of each support extends perpendicular to the face and the back, each support has holes to accept the support string.

12. The kit of claim 10 wherein:

the frame has a face and a back, and slots that extend from the face to the back between the interior edge and the exterior edge, the supports are inserted through the slots such that an even length of each support extends perpendicular to the face and the back, each support has holes to accept the support string.

* * * * *